March 18, 1930.
W. S. INGRAM
1,750,777
ELECTRICAL HEATING MEANS FOR AEROPLANE WINGS
TO PREVENT ACCUMULATION OF ICE AND SNOW
Filed Aug. 28, 1928  2 Sheets-Sheet 1
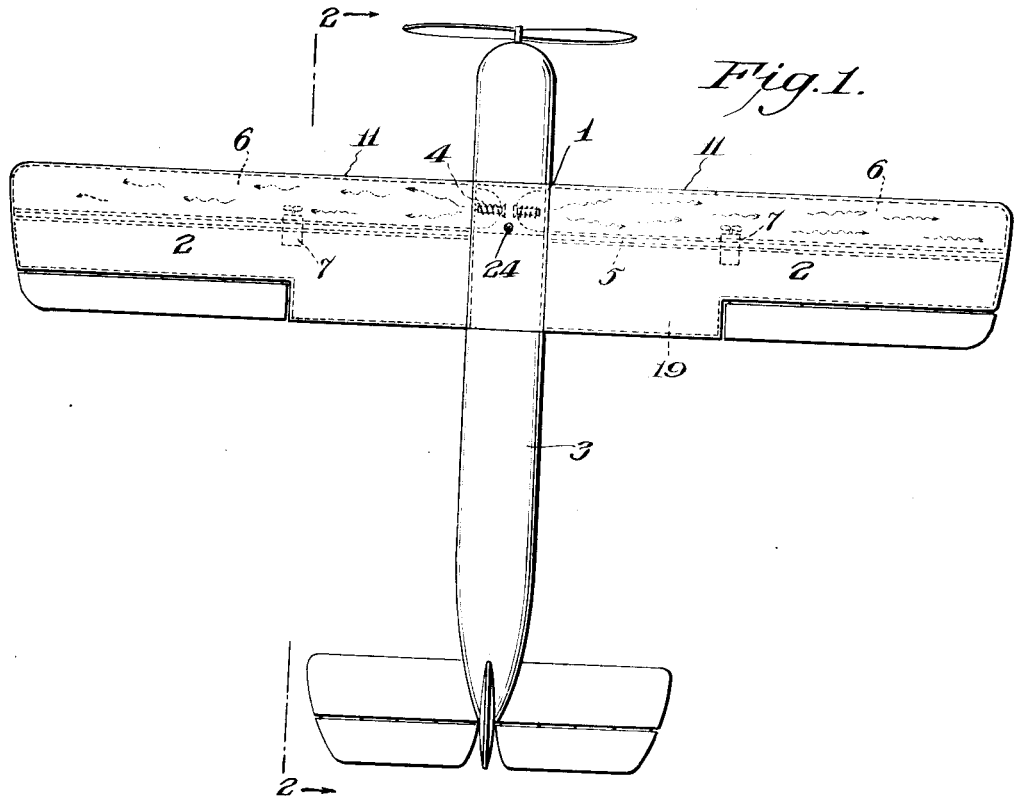
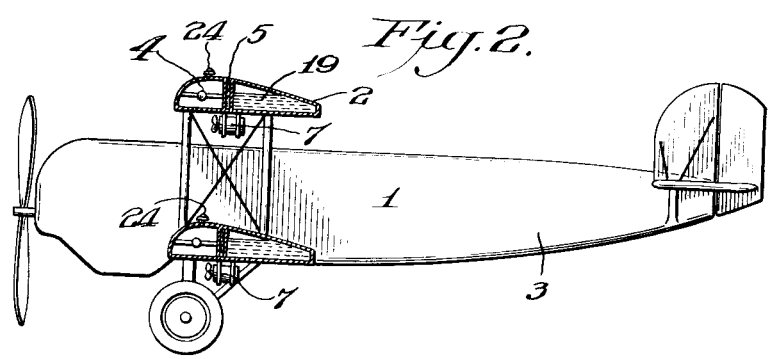
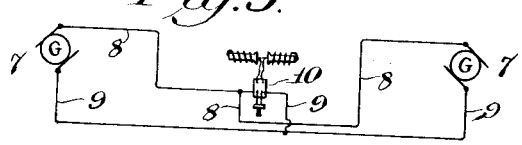
William S. Ingram, INVENTOR
BY Hubert S. Fairbanks, ATTORNEY

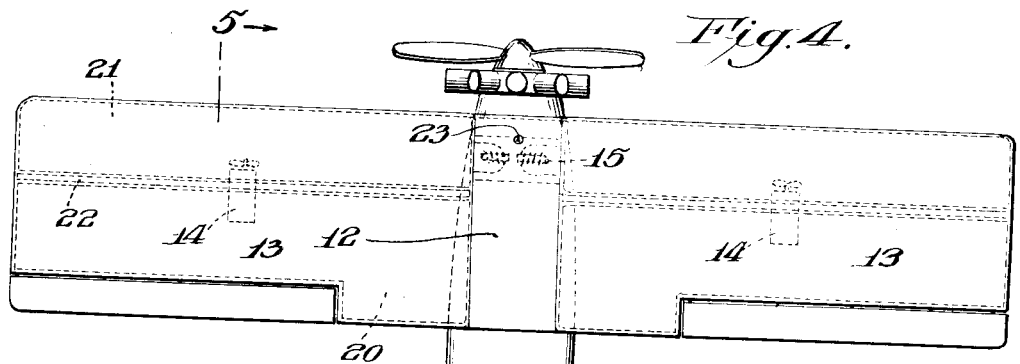

Patented Mar. 18, 1930

1,750,777

UNITED STATES PATENT OFFICE

WILLIAM S. INGRAM, OF PHILADELPHIA, PENNSYLVANIA

ELECTRICAL HEATING MEANS FOR AEROPLANE WINGS TO PREVENT ACCUMULATION OF ICE AND SNOW

Application filed August 28, 1928. Serial No. 302,524.

In the use of aeroplanes numerous accidents have occurred due to the increased weight of the wings caused by the accumulation of ice and snow thereon. It has heretofore been proposed to provide electrical heating units arranged within or serving as a part of the covering of the wings, and in the wall of the fuselage. These heating units derived heat from a battery which not only increased the weight of the aeroplane but necessitated the carrying of an extra source of electric supply.

The object of this invention is to devise a novel electrical heating means for aeroplane wings located within the chambers of the wings and which derives its electric current from the air driven generators carried by the wings which supply the electric current for the lighting system of the aeroplane.

A further object of this invention is to devise novel electrical heating means under the control of the aviator which will heat the forward portions of the wings which come into contact with the cold strata of air, ice, sleet or snow, and to construct and locate the heating unit in such a manner that it will not prohibit the use of the chamber within the wings for the storage of fuel or other supplies.

With the above and other objects in view as will hereinafter more clearly appear, my invention comprehends novel electrical heating means for aeroplane wings.

It further comprehends novel electrical heating means for aeroplane wings wherein the heating unit is located in the load plane carried by the fuselage so that in case of accident and the side wings become broken or destroyed, there is less danger of fire.

It further comprehends novel electrical heating means for aeroplane wings located wholly within the chamber of the aeroplane wing and carried by the load plane, the wings being preferably provided with an insulating wall so that the rear portion of the chamber can be used for storage purposes.

It further comprehends a novel electrical heating means which is supplied with electric current by the air driven generators carried by the aeroplane wing so that power which drives the plane is not utilized for driving the generators which supply the electric current for the heating unit.

Other novel features of construction and advantage will hereinafter more clearly appear in the detailed description and the appended claims.

For the purpose of illustrating the invention, I have shown in the accompanying drawings typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities, as herein set forth.

Figure 1 is a plan view of an aeroplane of the biplane type in conjunction with which electrical heating means embodying my invention are employed.

Figure 2 is a section on line 2—2 of Figure 1.

Figure 3 is a wiring diagram.

Figure 4 is a top plan view of an aeroplane of the monoplane type in conjunction with which electrical heating means embodying my invention is employed.

Figure 5 is a section on line 5—5 of Figure 4.

Figure 6 is a wiring diagram.

Similar numerals of reference indicate corresponding parts.

Referring to the drawings:—

In Figures 1 and 2 I have shown an aeroplane of the biplane type and it will be understood that my invention can be employed with any desired or conventional construction of aeroplane, the forms herein shown being only for the purpose of illustrating different manners of carrying out my invention in practice.

1 designates the load plane to which is connected, in any desired manner, the side planes or wings 2, and the load plane is fixed to the fuselage 3.

4 designates electrical heating units contained wholly within the chambers of the aeroplane wings and these heating units are located at the forward portion of the chamber which latter is divided by means of a longitudinally extending wall 5, preferably of insulating material, so that the rear chamber can be employed for the storage of gasoline or other supplies. This provides a circulating space 6 for the heating medium so that the forward portions of the wings of the biplane will be heated to such an extent that ice and snow will not accumulate thereon but will be melted, and due to the contour of the wings will be discharged therefrom.

The wings have connected to them in the usual manner, the air driven electrical generators 7 which are carried by the wings and provided with fans which operate the generators during the flight. These generators are air driven and provided with fans which supply the electric current for the light circuit of the aeroplane. It will thus be seen that power from the engine is not wasted in driving the generators which supply the current for heating the electrical heating units.

The leads 8 and 9 form the electrical connection between the generators and the heating unit, and a switch 10 is provided which is located in a position accessible to the aviator, so that, at the will of the aviator, the circuit can be opened or closed through the electrical heating units.

It will now be clear that the electrical heating unit will cause the front edge portion 11 of the wings to be warmed or heated to such an extent that ice or snow will not accumulate thereon.

Referring now to the embodiment seen in Figures 4 and 5, I have shown in this embodiment an aeroplane of the monoplane type in which the only difference is that the electrical heating units are in one of the wings instead of in the two wings of the biplane type shown in Figures 1 and 2. In this embodiment the load plane 12 has side wings 13 connected with it.

14 are the air driven generators secured beneath the side wings 13 and electrically connected with the heating unit 15 which is within the chamber of the load plane, which is in free communication with the chambers in the side planes. The heating unit 15 is provided with a support 16 secured to the walls of the load plane in any desired manner. The heating unit is provided with a core 17 of insulating material around which passes the coils 18.

In Figures 1 and 2 the insulating wall 5 contributes to form a storage space 19 and in a similar manner in Figures 4 and 5 a storage space 20 is formed by an insulating wall 22.

In Figures 4 and 5, 21 designates the forward edge portion of the wing which is subjected to the action of the heating of the heating unit.

In some cases arising in practice it is advantageous to provide means to prevent the over heating of the wing surface and thus eliminate any likelihood of any destructive action from the heating on the wing surface or on the materials stored in the storage space of the wing.

In the drawings I have shown this venting of the heating chamber as being accomplished by means of an automatic valve which on the monoplane type of wing is indicated as 23 and on the bi-plane type of wing it is indicated as 24. This valve can be of any desired or conventional construction and I have therefore deemed it unnecessary to illustrate and describe it in detail as any valve which will automatically open when the temperature is raised to the standard of temperature for which the valve is adjusted can be employed.

It will thus be seen that I provide means to prevent the over heating of the heating chamber so that such heating chamber can be maintained under a desired temperature, the heating means being under the control of the operator.

In this invention the heat radiates through the wall of the wing so that the forward portion of the wing can be maintained at a desired temperature.

It will be apparent that in the forms of my invention herein shown, I provide means contained wholly within the wings and carried by the load plane portions to effect the heating of the longitudinally extending front portion of each wing which is the place in which the ice and snow accumulates. I thus am enabled to maintain the exterior surface of the wings at such temperature that they will not accumulate ice or snow with the extra weight incident thereto.

The electric heating for the heating units is always under the control of the aviator, so that, at will, he can open or close the controlling switch, for example the switch 10.

In accordance with this invention the heating units are located wholly within the chamber of the wings so that they do not form a fire hazard and as they are located in the chamber of the load plane there is less chance of fire taking place than if they were located in the side wings of the plane since in case of accident the side wings often become broken.

It will now be apparent that I have devised a new and useful electrical heating means for aeroplane wings to prevent accumulation of ice and snow which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention what I claim as new and desire to secure by Letters Patent, is:—

1. In an aeroplane, the combination with the load plane and side wings with intercommunicating chambers forming a heating chamber in the nose of the side wings, said chambers being enclosed and extending through the load plane to the ends of the side wings, said wings having a storage space in rear of said heating chamber and the air driven electric generators carried by the side wings, of an electric heater contained wholly within the chamber of the load plane and electrically connected with said generators at the will of the operator.

2. In an aeroplane, the combination with the load plane and side wings with intercommunicating chambers, said chambers being enclosed and extending through the load plane to the ends of the side wings, and the air driven electric generators carried by the side wings, of an electric heater contained wholly within the chamber of the load plane and electrically connected with said generators at the will of the operator, and means to confine the heat from said electrical heater to the forward portion of the chambers of said load plane and side wings and to form a storage space in said side wings.

3. In an aeroplane, a wing having a longitudinal chamber extending laterally of the wing at its forward portion, an insulating wall dividing said chamber into a forward heating space and a rearward storage space, and means controllable at the will of the aviator, to vary the temperature in said heating space.

4. In an aeroplane, the combination with the load plane and side wings provided with intercommunicating chambers, at the forward portion of said plane and side wing and with a storage space in the side wings of an electrical heating unit contained wholly within one of said chambers, and means to control said heating unit.

5. In an aeroplane, a chambered wing having a forward heating chamber and a storage space, an electrical heater contained within said heating chamber, and means to vent said chamber.

6. An aeroplane having a laterally extending chamber at the forward portion of its wing and provided with a storage space, means controlled by the operator to effect the heating of said chamber and automatic valves communicating with said chambers and with the atmosphere to vent said chambers.

WILLIAM S. INGRAM.